United States Patent
Conradi et al.

(10) Patent No.: US 12,517,884 B2
(45) Date of Patent: Jan. 6, 2026

(54) STORAGE AND RETRIEVAL OF HETEROGENOUS SENSOR DATA

(71) Applicant: SAP SE, Walldorf (DE)

(72) Inventors: Christian Conradi, Reilingen (DE); Jens Abraham, Eschenlohe (DE)

(73) Assignee: SAP SE, Walldorf (DE)

( * ) Notice: Subject to any disclaimer, the term of this patent is extended or adjusted under 35 U.S.C. 154(b) by 29 days.

(21) Appl. No.: 17/836,848

(22) Filed: Jun. 9, 2022

(65) Prior Publication Data

US 2023/0401191 A1    Dec. 14, 2023

(51) Int. Cl.
*G06F 16/22* (2019.01)
*G06F 16/21* (2019.01)
*G06F 16/242* (2019.01)

(52) U.S. Cl.
CPC ........ *G06F 16/2282* (2019.01); *G06F 16/211* (2019.01); *G06F 16/213* (2019.01); *G06F 16/2423* (2019.01)

(58) Field of Classification Search
CPC .. G06F 16/2282; G06F 16/211; G06F 16/213; G06F 16/2423; G06F 16/252
See application file for complete search history.

(56) References Cited

U.S. PATENT DOCUMENTS

| | | | |
|---|---|---|---|
| 10,204,147 B2 * | 2/2019 | Crabtree | G06F 16/2477 |
| 11,392,605 B1 * | 7/2022 | Baskaran | G06F 16/254 |
| 2006/0004801 A1 * | 1/2006 | Hoefer | G06F 16/2365 |
| 2016/0125053 A1 * | 5/2016 | Willson | G06F 16/219 707/746 |
| 2016/0210316 A1 * | 7/2016 | Bendel | G06F 16/219 |

(Continued)

FOREIGN PATENT DOCUMENTS

| | | | |
|---|---|---|---|
| CN | 112905571 A | * | 6/2021 |
| CN | 114756547 A | * | 7/2022 |

(Continued)

OTHER PUBLICATIONS

Madden et al., 2003. The design of an acquisitional query processor for sensor networks. In Proceedings of the 2003 ACM SIGMOD international conference on Management of data (SIGMOD '03). Association for Computing Machinery, New York, NY, USA, 491-502. https://doi.org/10.1145/872757.872817 (Year: 2003).*

(Continued)

*Primary Examiner* — Neveen Abel Jalil
*Assistant Examiner* — Hubert Cheung
(74) *Attorney, Agent, or Firm* — Klarquist Sparkman, LLP

(57) ABSTRACT

A computer implemented method can receive a write request to store sensor data generated by a sensor group including a plurality of sensors. The sensor data includes at least a structure identifier and one or more pairs of sensor parameters and sensor values. The method can identify a metadata structure based on the structure identifier. The metadata structure includes a plurality of tuples corresponding to the plurality of sensors in the sensor group. The tuples define pairs of field names and data types of the corresponding sensors. The method can pack the one or more pairs of sensor parameters and sensor values into one or more data containers, and store the one or more data containers respectively into one or more columns of a sensor data table.

18 Claims, 10 Drawing Sheets

(56) References Cited

U.S. PATENT DOCUMENTS

| | | | |
|---|---|---|---|
| 2017/0212937 A1* | 7/2017 | Rinke | G06Q 10/10 |
| 2018/0101572 A1* | 4/2018 | Conradi | G06F 16/2228 |
| 2018/0218019 A1* | 8/2018 | Libow | G06F 16/86 |
| 2019/0050436 A1* | 2/2019 | Deshpande | G06F 16/273 |
| 2019/0095241 A1* | 3/2019 | Ago | G06F 9/468 |
| 2019/0251764 A1* | 8/2019 | Wang | G06F 16/2282 |
| 2020/0177712 A1* | 6/2020 | Wildhagen | G06F 9/542 |
| 2020/0285625 A1* | 9/2020 | Baba | G06F 16/26 |
| 2022/0043807 A1* | 2/2022 | Dwivedi | G06F 16/2379 |
| 2022/0058069 A1* | 2/2022 | Bhatia | G06F 16/2379 |
| 2022/0058166 A1* | 2/2022 | Bhatia | G06F 16/2456 |
| 2022/0247695 A1* | 8/2022 | Kulkarni | G06F 16/248 |
| 2023/0018723 A1* | 1/2023 | Dhoke | G06F 3/065 |

FOREIGN PATENT DOCUMENTS

| | | | | |
|---|---|---|---|---|
| EP | 3608744 A1 * | 2/2020 | | B64D 45/00 |
| KR | 102315070 B1 * | 10/2021 | | |

OTHER PUBLICATIONS

Cassandra Basics, "What is Apache Cassandra?," Apache Cassandra Documentation, https://cassandra.apache.org/_/cassandra-basics.html, printed Feb. 25, 2022, 10 pages.

Cassandra-7396, "Allow selecting Map values and Set elements," ASF JIRA, https://issues.apache.org/jira/browse/CASSANDRA-7396, printed Mar. 4, 2022, 11 pages.

"Update: CQL for Cassandra 3.0." https://docs.datastax.com/en/cql-oss/3.3/cql/cql_reference/cqlUpdate.html, printed May 29, 2022.

SAP HANA SQL Reference Guide for SAP HANA Platform, "Large Object (LOB) Data Types," https://help.sap.com/viewer/7c78579ce9b14a669c1f3295b0d8ca16/Cloud/en-US, printed Apr. 7, 2022, 3 pages.

SAP Internet of Things, SAP Business Technology Platform, "What is SAP Internet of Things?," https://www.sap.com/products/iot-data-services.html, printed Apr. 6, 2022, 4 pages.

SAP NetWeaver Master Data Management (MDM), Working with Binary Large Objects (BLOBs), https://help.sap.com/viewer/691b78a1277346c995c240dd6ba34f6c/7.1.18/en-US, printed Apr. 7, 2022, 7 pages.

* cited by examiner

710

| structure_id | Fields |
|---|---|
| engine | [('oil-pressure', 'float'), ('power', 'float')] |
| tire | [('rotations', 'integer'), ('air-pressure', 'float'), ('temperature', 'float')] |

720

| structure_id | object_id | time | float_values | integer_values |
|---|---|---|---|---|
| engine | engine_1 | 2021-03-15 10:14:10 | {'oil-pressure': 14.5, 'power': 100.8} | |
| engine | engine_1 | 2021-03-15 10:14:11 | {'oil-pressure': 15.5, 'power': 120.5} | |
| engine | engine_1 | 2021-03-15 10:14:12 | {'oil-pressure': 16.7, 'power': 140.2} | |
| tire | front_left_tire | 2021-03-15 11:17:30 | {'air-pressure': 4.5, 'temperature': 90.8} | {'rotations': 1020} |
| tire | front_left_tire | 2021-03-15 11:17:31 | {'air-pressure': 4.8, 'temperature': 91.2} | {'rotations': 1030} |
| tire | front_left_tire | 2021-03-15 11:17:32 | {'air-pressure': 5.1, 'temperature': 92.1} | {'rotations': 1040} |
| tire | front_left_tire | 2021-03-15 11:17:33 | {'air-pressure': 4.5, 'temperature': 90.8} | {'rotations': 1020} |

| structure_id | Fields |
|---|---|
| engine | [('oil-pressure', float), ('power', float), ('engine-rotations', integer)] |
| tire | [('rotations', integer), ('air-pressure', float), ('temperature', float)] |

820

| structure_id | object_id | time | float_values | integer_values |
|---|---|---|---|---|
| engine | engine_1 | 2021-03-15 10:14:10 | {'oil-pressure': 14.5, 'power': 100.8} | |
| engine | engine_1 | 2021-03-15 10:14:11 | {'oil-pressure': 15.5, 'power': 120.5} | |
| engine | engine_1 | 2021-03-15 10:14:12 | {'oil-pressure': 16.7, 'power': 140.2} | |
| tire | front_left_tire | 2021-03-15 11:17:30 | {'air-pressure': 4.5, 'temperature': 90.8} | {'rotations': 1020} |
| tire | front_left_tire | 2021-03-15 11:17:31 | {'air-pressure': 4.8, 'temperature': 91.2} | {'rotations': 1030} |
| tire | front_left_tire | 2021-03-15 11:17:32 | {'air-pressure': 5.1, 'temperature': 92.1} | {'rotations': 1040} |
| tire | front_left_tire | 2021-03-15 11:17:33 | {'air-pressure': 4.5, 'temperature': 90.8} | {'rotations': 1020} |
| engine | engine_1 | 2021-03-15 13:10:00 | {'oil-pressure': 14.8, 'power': 130.8} | {'engine-rotations': 3000} |

FIG. 8

STORAGE AND RETRIEVAL OF HETEROGENOUS SENSOR DATA

BACKGROUND

As computing devices become smaller and more powerful, increasing amounts of data can become available for analysis. For example, sensors (which can be incorporated into smaller devices that are in turn paired with larger devices) that are connected to a network, either wirelessly or via a wired connection, are increasingly being incorporated into devices or environments. These interconnected devices can be referred to as the Internet of Things (IOT).

Cloud database services can be used to store and retrieve vast amount of data produced by IOT devices. A cloud service provider can provide cloud database services to many customers, each of whom may employ a unique set of IOT devices involving a diverse array of sensors. The amount of data produced by the sensors can be massive, and data types generated by different sensors can also vary. Accordingly, room for improvement exists in dealing with IOT data, including efficient storage and retrieval of heterogenous sensor data.

BRIEF DESCRIPTION OF THE DRAWINGS

FIG. 7 depicts an updated structure table and an updated sensor data table, according to one example.

FIG. 8 depicts another updated structure table and another updated sensor data table, according to one example.

DETAILED DESCRIPTION

Figure 1:
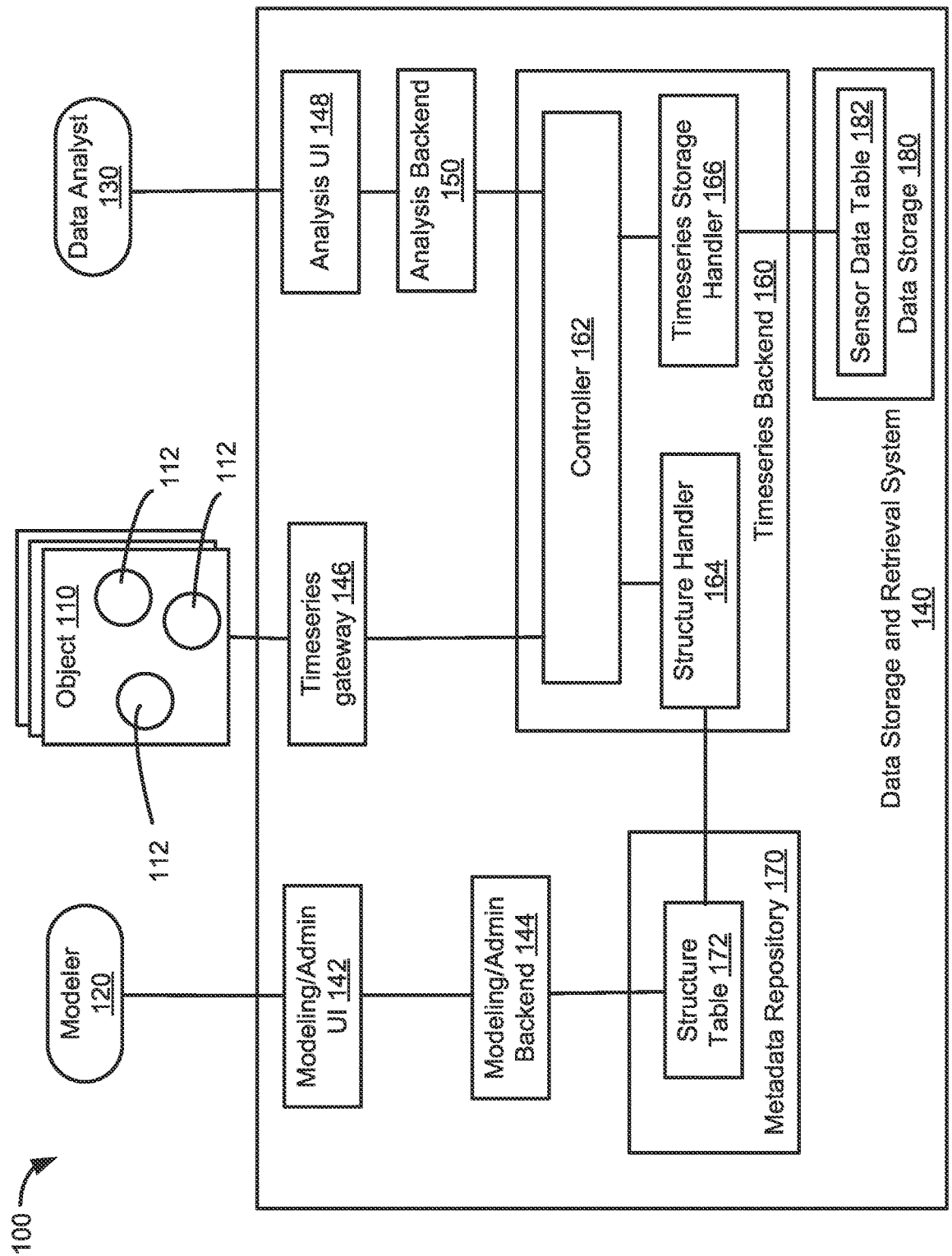
FIG. 1 is an overall block diagram of an example database system supporting metadata-driven and containerized storage and retrieval of heterogenous sensor group data.

Example 1—Overview of Storage and Retrieval of Sensor Group Data

IOT devices can generate a large amount of timeseries data. For examples, sensors of an object (e.g., an IOT device) can continuously measure relevant status/parameters of the object (e.g., rotations, temperature, pressure, etc.). Higher sampling frequency can result in a larger amount of incoming sensor data. These sensor data, along with timestamps of the measurement, can be sent to and stored in large database systems. Through an application programming interface (API), selected sensor data can be retrieved from the database systems for analysis, e.g., to generate line chart diagrams to visualize the timeseries, to detect the outliers and/or abnormality of the timeseries, or the like. Some timeseries analysis requires the sensor data to be stored for a long period of time, sometimes for years.

Users may be interested in using different sensors to measure different things. For example, a car user may be interested to know the operating condition of each car tire and the car engine. For the car tire, measurement of tire pressure and tire temperature may be important. For the car engine, measurement of oil pressure and rotation speed may be important. Another user of a weather station may be interested to measure humidity, air temperature, air pressure, and wind speed. Yet another user of drilling machines may be interested to measure rotations, torque, and directions.

Many of these sensors can be grouped together in distinct sensor groups or sensor sets (such as the car tire, car engine, weather station, and drilling machines from the examples described above). In some circumstances, grouping of the sensors can be useful for data modeling. In some circumstances, different sensors having a common sampling frequency can be grouped together so that sensor data from these sensors can be transmitted together through a group handling mechanism. In some circumstances, related sensors can be grouped together so as to allow joint storage of related sensor data to facilitate fast retrieval and joint analysis of the sensor data. As described herein, the sensor data generated by a sensor group is also referred to as sensor group data.

As one example, Table 1 shows a sensor group for a car tire, which includes three sensors configured to respectively measure rotation, pressure, and temperature of the tire.

TABLE 1

An example sensor group for a car tire.

| Tire Sensors | Data Type | Example Sensor Value |
|---|---|---|
| Rotation | Int | 1020/min |
| Pressure | Float | 4.5 Bar |
| Temperature | Float | 90.8° C. |

As another example, Table 2 shows another sensor group for a machine, which includes one status property and four additional sensors configured to respectively measure vibration at the inlet, temperature at the inlet, vibration at the outlet, and temperature at the outlet. The status property can be provided by the machine (e.g., via a switch, a dedicated sensor, an on-board processor, or the like), and may also be deemed to be generated by a virtual property sensor.

TABLE 2

An example sensor group for a machine.

| Machine Sensors | Data Type | Example Sensor Value |
|---|---|---|
| Status | String | Starting |
| Vibration Inlet | Int32 | 20,000 |
| Temperature Inlet | Float | 300° C. |
| Vibration Outlet | Int32 | 15,000 |
| Temperature Outlet | Float | 250° C. |

Sensor group data can be highly heterogenous, which can be manifested by various data types of different sensors contained in one sensor group, and/or different numbers of sensors contained in different sensor groups. For example, the sensor group for the car tire depicted in Table 1 can generate sensor data in both integer and float data types, whereas the sensor group for the machine depicted in Table 2 can generate sensor data in string, 32-bit integer, and float data types. Other data types (e.g., double, Boolean, Date, Time, etc.) can also be generated by certain sensors in a sensor group. Further, the sensor groups can have an arbitrary number of sensors. For example, the sensor groups of Tables 1 and 2 have three and five sensors, respectively. In other examples, one sensor group can have less than three sensors, whereas another sensor group can have hundreds or thousands of sensors. In certain scenarios, different sensors in a sensor group can have different sampling frequencies so as to generate sensor data at different rates.

Cloud database services can be used to store and retrieve vast amount of sensor data. Multitenancy is a feature in many types of cloud computing services, where a service provider can support multiple clients of different customers (called "tenants") within a cloud solution. In a database-as-a-service (DBaaS) environment, multitenancy means that the cloud solution can support multiple users accessing multiple databases from multiple tenants, and each tenant can have one or more databases. In a DBaaS environment, the cloud service provider may not wish to provide a dedicated database system for every single tenant to conserve resources. Instead, the cloud service provider may store the data of different tenants in one common database system. One particular challenge for the cloud service provider is to find a solution to store heterogenous sensor group data in a suitable way so that it not only allows efficient sensor data storage, but also supports fast and efficient sensor data retrieval.

As an example, one database system used in a multitenant environment is Apache Cassandra, which is a free and open-source, distributed, wide-column store, non-relational database management system designed to handle large amounts of data across many commodity servers and provide high availability. However, conventional approaches for storing heterogenous sensor group data in Apache Cassandra are problematic due to limitations of the underlying storage architecture.

For example, according to one conventional approach, a sensor data table can be created for each sensor group, and each sensor in the sensor group can define a column of the sensor data table (e.g., sensor values measured by three sensors in a sensor group can be stored in three columns of a sensor data table dedicated to the sensor group). However, the number of database tables that can be managed by Apache Cassandra (and many other database system) is limited, so it is not technically feasible to create a table for each sensor group of every tenant. For example, with several hundred sensor groups per tenant and growing number of tenants (because the intended scalability of the cloud solutions), this approach can lead to millions of tables which exceeds the capacity of the database system.

Another conventional approach is to configure one or some sensor data tables with predefined generic columns for all data types. However, the number of different sensor groups having different data types can lead to large sensor data tables, which can be difficult to maintain. Further, in many cases, only a subset of columns may be used, which can lead to a high sparsity of the sensor data tables. Although the problem of large sparsity may be mitigated by data compression or other technologies, it can bring many complexities. For example, the database system still needs to perform mapping from the sensors to generic columns, which can be further complicated if certain generic columns need to be reused for different sensors. Such complexity arises due to the need to maintain some dictionaries, which store the mapping of the generic columns to many sensors in different sensor groups. In addition, both writing operation (to find fitting columns) and reading operation (to retrieve from correct columns) can be further complicated by compression/decompression processes.

As another example, heterogenous sensor group data of a tenant can be stored in one single sensor data table using binary large object (BLOB) data format, as implemented in SAP Internet of Things, provided by SAP SE of Walldorf, Germany. In this approach, instead of creating an arbitrary number of generic table columns, the heterogenous sensor data of a sensor group can be translated into a string (referred to as a BLOB) via a revertible transformation in an application server. The BLOB can then be transferred to a database server, where it can be stored in a single column of the sensor data table. Each entry of the sensor data table can include the name of the sensor group, the current set of sensors with corresponding data types, the measured sensor values can be stored in the BLOB format. However, this approach has limitations. First, converting sensor data to BLOB format during data storage and reverting back from BLOB format to raw sensor data during data retrieval can require additional computing resources. Second, data retrieval can be inefficient because a data entry in BLOB format lumps many different sensor values in one string. As a result, each time when sensor data for a record is needed, the whole BLOB string which contains all sensor values within the record will be transferred back to the application. For example, if a sensor group includes hundreds of sensors and a large time range is queried, the query may cause a large amount of data (e.g., sensor values of the hundreds of sensors measured in the time range) to be transferred between the database server and the applications server, even if only one of the hundreds of sensors is of interest, and the transferred data of other sensors will be discarded. In other words, when only a small number of sensors need to be read, the overhead of unnecessary data being transferred can be huge, which wastes computing resources and/or network bandwidth.

The technology described herein can overcome the shortcomings described above by using a metadata-driven and containerized data storage and retrieval architecture. As described more fully below, the new architecture allows easy storage of heterogenous sensor group data of a tenant (which can include any number of sensor groups and arbitrary numbers of sensors with different data types within individual sensor groups) into one single sensor data table specific to the tenant. Retrieval of sensor data from the sensor data table can be targeted such that only requested sensor data is returned without incurring additional overhead or waste (in contrast to the BLOB approach described above where some unneeded/unrequested sensor data may also be returned and then discarded). Such flexibility in sensor data storage and retrieval can be enabled by a unique structure table, which contains metadata structures charactering the sensor groups.

Example 2—Example Overview of a Database System Supporting Metadata-Driven and Containerized Storage and Retrieval of Heterogenous Sensor Group Data FIG. 1 shows an overall block diagram of an example database system 100 configured to support metadata-driven and containerized storage and retrieval of heterogenous sensor data.

The database system 100 includes a data storage and retrieval system 140, which can interact with a plurality of objects 110. The objects 110 can be IOT devices embedded with sensors 112. Example objects 110 can be car tires, car engines, weather stations, machines, smart appliances, wearable devices, etc. An object 110 can include one or more sensors 112 configured to measure parameters, status, and/or environment of the object 110. A plurality of sensors 112 in an object 110 can define a sensor group. In certain examples, several objects 110 can share the same sensor group. For example, if each of the four tires of a car has the same set of sensors (e.g., the sensors in Table 1), those four tires can share the same sensor group. The sensors 112 in the objects 110 can generate timeseries of sensor data with different data types, which can be transmitted to the data storage and retrieval system 140.

As shown, the data storage and retrieval system 140 can include a modeling and/or administrative user interface (UI) 142, a modeling and/or administrative backend 144, a timeseries gateway 146, an analysis UI 148, an analysis backend 150, a metadata repository 170, a timeseries backend 160, and a data storage 180.

As described herein, the data storage 180 can be configured to store timeseries of sensor data measured by the sensors 112, whereas metadata describing structural information of the sensor data can be stored in the metadata repository 170.

Through the modeling and/or administrative UI 142, a modeler 120 can generate/edit computer models of the objects 110 through the modeling and/or administrative backend 144, which can be a modeling software configured to represent physical objects in computer models. In certain examples, each object 110 can be modeled as a metadata structure, which includes fields that identify the object, specify a sensor group corresponding to the object, and define various sensors included in the object. In certain examples, the metadata structures corresponding to a plurality of objects 110 can be stored in a structure table 172 contained in the metadata repository 170. In certain examples, the metadata repository 170 can include a plurality of structure tables 172 for different clients. Each structure table 172 can store metadata structures corresponding to objects 110 that belong to one specific client. Thus, the metadata repository 170 can store information about all metadata structures used in storing the timeseries of sensor data in the data storage 180.

Through the analysis UI 148, a data analyst 130 or other users can access the analysis backend 150, which can be a software application configured to view, analyze, and/or report sensor data stored on the data storage 180.

The timeseries gateway 146 can be configured as an interface between the sensors 112 and the timeseries backend 160. In certain examples, the timeseries gateway 146 can control what sensor data are fed into the timeseries backend 160 (e.g., by accepting or rejecting some of the sensor data). In certain examples, the timeseries gateway 146 can preprocess (e.g., by means of formatting, filtering, down/up sampling, etc.) the timeseries of sensor data before feeding the sensor data to the.

The timeseries backend 160 can include a controller 162, a structure handler 164, and a timeseries storage handler 166. The controller 162 can interact with both the structure handler 164 and the timeseries storage handler 166. In certain examples, the controller 162 can receive write requests (e.g., from the timeseries gateway 146) to store timeseries of sensor data into the data storage 180. Additionally, the controller 162 can receive read requests (e.g., from the analysis backend 150) to retrieve sensor data stored in the data storage 180.

The data storage 180 can store a plurality of sensor data tables 182, and each sensor data table can correspond to one specific client. As described further below, a sensor data table 182 can be configured to store heterogenous sensor data obtained from an arbitrary number of sensor groups or objects 110.

The structure handler 164 can be configured to manage processing, evaluating, and storing metadata structures contained in the structure tables 172, and supply such metadata information to the timeseries storage handler 166 for efficient storage and/or retrieval of sensor data in the sensor data tables 182.

The timeseries storage handler 166 can be configured to interact with the sensor data tables 182 bidirectionally (e.g., read and write). For example, the timeseries storage handler 166 can be configured to store the timeseries of sensor data into respective sensor data tables 182. Specifically, the timeseries storage handler 166 can obtain related metadata structures from the metadata repository 170 and use such metadata information to pack sensor values of the same data types into corresponding data containers (also referred to as "buckets"). The packed data containers can be saved into respective columns of the sensor data table 182. In certain examples, different data containers can correspond to different data types. In addition, the timeseries storage handler 166 can be configured to read selected sensor values stored on the sensor data tables 182. As described further below, using the metadata information provided by the metadata structures, such reading process can be targeted such that only sensor data that is specifically requested (and needed) is returned.

In practice, the systems and subsystems shown herein, such as the database system 100, can vary in complexity, with additional functionality, more complex components, and the like. For example, there can be additional functionality within the data storage and retrieval system 140. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The database system 100 and any of the other systems/subsystems described herein can be implemented in conjunction with any of the hardware components described herein, such as the computing systems described below (e.g., processing units, memory, and the like). In any of the examples herein, the metadata, the sensor data, and the like can be stored in one or more computer-readable storage media or computer-readable storage devices. The technologies described herein can be generic to the specifics of operating systems or hardware and can be applied in any variety of environments to take advantage of the described features.

Figure 2:
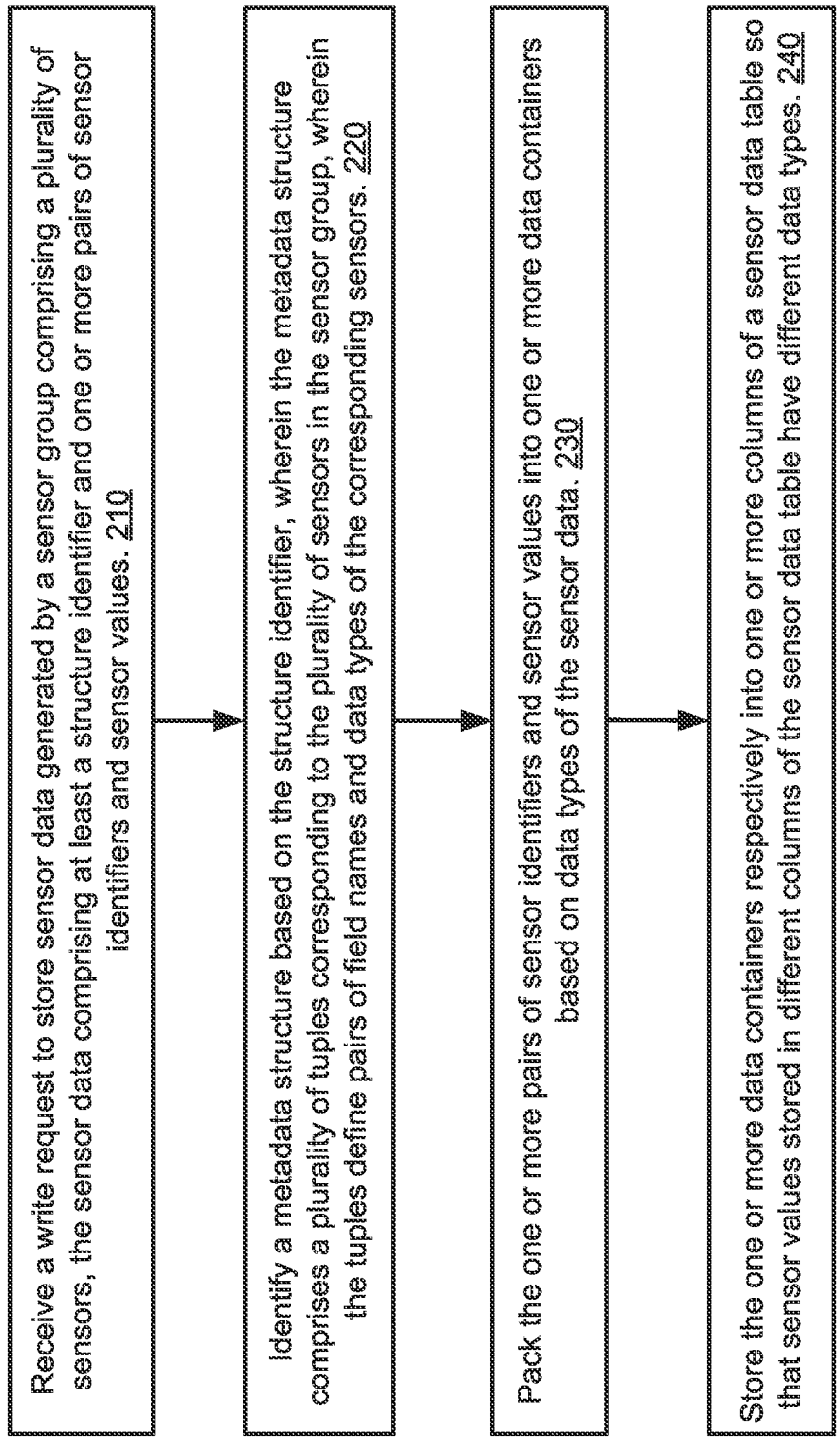
FIG. 2 is a flowchart illustrating an example overall method of implementing metadata-driven and containerized storage and retrieval of heterogenous sensor group data.

Example 3—Example Overall Method of Implementing Metadata-Driven and Containerized Storage and Retrieval of Heterogenous Sensor Group Data FIG. 2 is a flowchart illustrating an overall method of implementing metadata-driven and containerized storage and retrieval of heterogenous sensor group data, and can be performed, for example, by the database system of FIG. 1.

At 210, the method 200 can receive a write request to store sensor data generated by a sensor group comprising a plurality of sensors (e.g., the sensors 112 in an object 110 can define a sensor group). The sensor data can include at least a structure identifier and one or more pairs of sensor parameters and sensor values. As described herein, the sensor values can be in different data types and arranged in timeseries.

In some examples, the senor data can also include a timestamp for each pair of sensor parameter and sensor value. The timestamps can record the time when the sensor values are measured. In some examples, the sensor data can include object identifiers representing the objects containing the sensors. In some examples, the object identifiers can be text strings identifying corresponding objects (e.g., "engine_1," "front_left_tire," etc.). In other examples, the object identifiers can be coded as integers or other enumerated values. In some examples, the sensor data can include additional information related to the sensors (e.g., status of the sensors, etc.).

In some examples, the structure identifiers can be text strings identifying different sensor groups shared by certain types of objects (e.g., "engine" for a sensor group shared by car engines, "tire" for a sensor group shared by car tires, etc.). In other examples, the structure identifiers can be coded as integers or other enumerated values.

In some examples, the sensor parameters can be text strings identifying corresponding parameters measured by the sensors (e.g., "Temperature," "Rotation," etc.). In other examples, the sensor parameters can be coded as integers or other enumerated values.

At 220, the method 200 can identify a metadata structure based on the structure identifier. As described above, the metadata structure can be stored in a structure table 170 and retrieved by the structure handler 164. Each metadata structure can have a corresponding structure identifier. Thus, by searching the structure table, a metadata structure corresponding to the sensor data can be identified if the structure identifier contained in the metadata structure matches the structure identifier contained in the sensor data.

As described further below, the metadata structure can include a plurality of tuples corresponding to the plurality of sensors in the sensor group. As described herein, each tuple can be a two-element pair, which defines a field name and a data type of a corresponding sensor. In certain examples, the field names can be text strings (e.g., "Temperature," "Pressure," etc.) indicating what parameters are measured by the sensors. In other examples, the field names can be coded by integers or other enumerated values. In certain examples, the data types can be represented by text strings (e.g., "integer," "float," "string," etc.). In other examples, the data types can be coded by integers or other enumerated values (e.g., 1 as integer, 2 as float, 3 as string, etc.). Thus, as the name indicates, a metadata structure defines structural information of a corresponding sensor group, including information about what parameters are measured by the sensors in the sensor group and what data types are generated by those sensors.

At 230, the method 200 can pack or group the one or more pairs of sensor parameters and sensor values into one or more data containers. In certain examples, the packing or grouping can be based on data types of the sensor data. For example, sensor values that have the same data type (together with the corresponding sensor parameters) can be packed in one data container specific to the data type. Different data containers can be used to pack sensor values (and the corresponding sensor parameters) of different data types. For example, one data container can be used to pack sensor data having the "integer" data type, another data container can be used to pack sensor data having the "float" data type, another data container can be used to pack sensor data having the "double" data type, etc.

In certain examples, a data type can have two or more sub-types. For example, the "integer" data type can have two subtypes "integer16" and "integer 32" representing 16-bit integer and 32-bit integer, respectively. In some circumstances, different subtypes can be treated as the same data type and packed into one data container. In other circumstances, different subtypes can be treated as different data types and packed into different data containers (specific to corresponding subtypes). Whether different subtypes of a data type are packed into the same or different data containers can be configured by a user.

In other examples, sensor data having mixed data types can be grouped into one data container. For example, a data container can be configured to pack sensor values having both integer and float data types. In fact, a data container can be configured by a user to pack sensor values of any specified data types.

In one specific example, the data containers can be implemented as MAP data type in Apache Cassandra, which allows storage of a set of key-value pairs. For example, the keys in a MAP can store sensor parameters and the values can store corresponding sensor values. In other examples, the data containers can be implemented by other similar data types (e.g., dictionary, hashmap, associated array, etc.).

At 240, the method 200 can store the one or more data containers respectively into one or more columns of a sensor data table (e.g., 182). If the data containers are type-specific (e.g., grouping is based on data types of the sensor data), then sensor values stored in different columns of the sensor data table have different data types, whereas sensor values stored in one column of the sensor data table have the same data type. For example, one column of the sensor data table stores sensor data having the "integer" data type, a different column of the sensor data table stores sensor data having the "float" data type, etc. If the data containers are not type-specific (e.g., mixed data types are grouped into one data container), then sensor values stored in one column of the sensor data table can have different data types.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 4—Example Structure Table and Sensor Data Table

Figure 3:
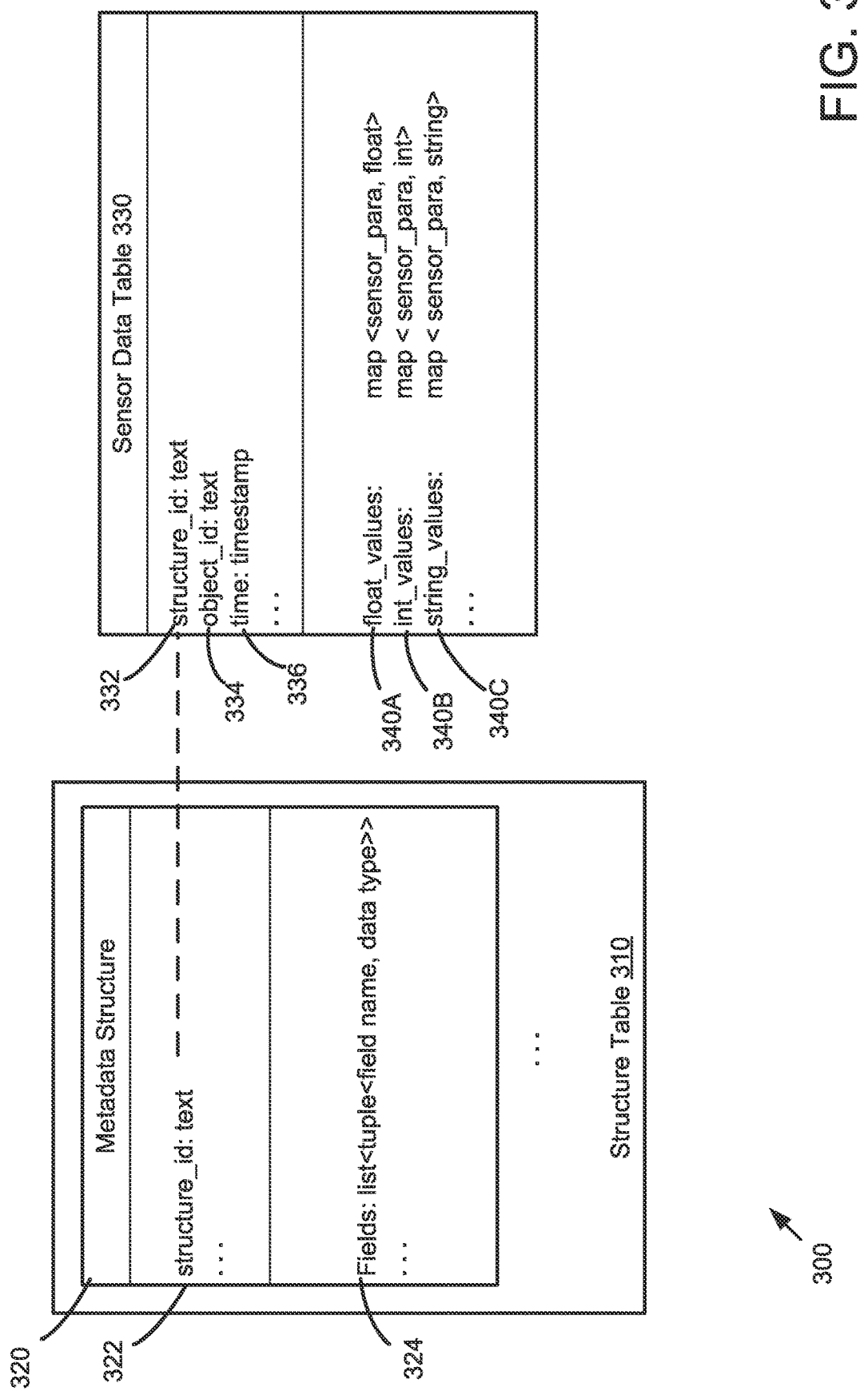
FIG. 3 depicts a structure table containing metadata structures and a sensor data table, according to one example.

FIG. 3 depicts a schematic diagram 300 illustrating relationship between a structure table 310 and a sensor data table 330. As described above, the structure table 310 can be stored in a metadata repository (e.g., 170) and the sensor data table 330 can be stored in a data storage (e.g., 180). The structure table 310 can include one or more metadata structures 320.

For a multitenant database system, each tenant can have one structure table 310 and one sensor data table 330. Sensor data measured by all sensors (organized in one or more sensor groups) of the tenant can be stored in the tenant-specific sensor data table 330, whereas structure information about those sensors can be stored in the tenant-specific structure table 310.

The structure table 310 can include one or more metadata structures 320, depicting structural information of the corresponding sensor groups. Each time a new sensor group is created (e.g., by a modeler 120), a corresponding metadata structure 320 can be created in the structure table 310. Likewise, when a sensor group is updated (e.g., a new sensor is added to a sensor group, a sensor is removed from a sensor group, a sensor is replaced with a different sensor, etc.), a new metadata structure 320 can be added to the structure table 310 reflecting the updated sensor group. In some circumstances, the metadata structure corresponding to the old sensor group (before updating) can remain in the structure table 310 without being deleted, e.g., if there is still sensor data stored in the sensor data table 330 that relies on the metadata structure corresponding to the old sensor group.

As shown, a metadata structure 320 can include a structure identifier (ID) 322, which is represented by a text string in this example. In some examples, the metadata structure 320 can include additional information pertaining to the corresponding sensor group, such as sensor data categories, time of sensor data deletion, versioning of the sensor data group, etc. The metadata structure 320 can also include a list of fields organized in two-element tuples 324. Each tuple 324 can include a field name corresponding to a sensor and date type generated by the sensor. In some examples, the list of fields can be stored in different formats. For example, the list of fields can be stored in a field table that is linked to the structure table 310, wherein the field names of the sensors and corresponding data types of the sensors can be stored in two columns of the field table. As another example, the list of fields can be stored using the MAP data type in Apache Cassandra, wherein the keys in the MAP can store field names of the sensors and the values can store data types of the sensors.

The sensor data table 330 is configured to store actual sensor data. For example, the sensor data table 330 can store structure IDs 332 which identify corresponding sensor groups, object IDs 334 which identify specific objects, timestamps 336 indicating measurement times of the sensor values, and one or more data containers 340A, 340B, 340C, etc. (collectively 340) storing pairs of sensor parameters and sensor values. In certain examples, the sensor data table 330 can include additional information pertaining to the sensor data.

As described above, the data containers 340 can be specific to data types. For example, the data container 340A can store pairs of sensor parameters and sensor values where the sensor values are float data type, the data container 340B can store pairs of sensor parameters and sensor values where the sensor values are integer data type, the data container 340C can store pairs of sensor parameters and sensor values where the sensor values are text string data type, etc. Alternatively, one or more of the data containers 340 can have mixed data types. For example, depending on applications, a user may configure one data container to pack numerical sensor data of various data types (e.g., integer, float, double, etc.) and another data container to pack non-numerical sensor data of different data types (e.g., strings, status, etc.).

As described above and further illustrated below, each data container 340 can be stored in a distinctive column of the sensor data table 330.

In certain examples, the number of data containers 340 can be predefined. For example, if the data containers 340 are data type-specific and it is known that the sensor data have only ten different data types, exactly ten data containers (stored in ten columns) corresponding to those ten different data types can be predefined in the sensor data table 330. In other examples, the number of data containers 340 can be adaptively increased as new data type is introduced, e.g., after adding a new sensor having a new data type than existing sensors. For example, the sensor data table 330 may initially include only two data containers 340 (stored in two columns) corresponding to integer and float data types, respectively. After introducing a new sensor which generate double type sensor values, a new data container (thus a new column) corresponding to the double data type can be created in the sensor data table 330.

As described herein, the structure ID 332 of the sensor data can be used to identify a matching metadata structure 320, which contains the identical structure ID 322 (as indicated by the dashed line in FIG. 3). For example, if the sensor data are measured by sensors in an engine (e.g., the structure ID 332 is "Engine"), a corresponding metadata structure 320 with a matching structure ID 322 "Engine" can be identified (e.g., by string comparison, or the like).

Example 5—Example Method of Adding a Metadata Structure to a Structure Table

Using the Apache Cassandra as an example, the following INSERT statement written in the Cassandra Query Language (CQL) illustrates how a metadata structure (e.g., 320) can be added to a structure table (e.g., 310). Adding a metadata structure to a structure table can also be referred to as "registering" the metadata structure in the structure table.

INSERT INTO tenant.structures (structure_id, Fields)
   VALUES ('tire', [('rotations', 'integer'), ('air-pressure', 'float'), ('temperature', 'float')]);

Here, the term "tenant" specifies a keyspace (similar to a database schema) which represents the client's data section (e.g., identifying which tenant the metadata structure and the structure table belongs to). The term "structures" specifies a structure table specific to the tenant.

In this example, the metadata structure represents a tire sensor group having three sensors, similar to the example depicted in Table 1. Specifically, the INSERT statement adds a new metadata structure with a structure ID "tire" to the tenant-specific structure table (e.g., "tenant.structures"). The new metadata structure defines three tuples (in parentheses): a first tuple corresponding to the rotation sensor has a field name "rotation" and a data type "integer," a second tuple corresponding to the pressure sensor has a field name "air-pressure" and a data type "float," and a third tuple corresponding to the temperature sensor has a field name "temperature" and a data type "float."

Although three tuples are described herein as an example, it is to be understood that the INSERT statement can define a metadata structure having an arbitrary number of tuples corresponding to respective sensors in a sensor group. In certain examples, the order of the tuples within the INSERT statement (and the metadata structure) can be arbitrary.

Additional examples of adding and/or updating metadata structures in a structure table are described in "Example 9—Example Use Cases" below.

Example 6—Example Method of Saving Sensor Data to a Sensor Data Table

As another example, the following INSERT statement written in CQL illustrates how measured sensor data from a tire sensor group can be saved to a sensor data table (e.g., 330).

INSERT INTO tenant.measurements (structure_id, object_id, time, float_values, int_values)
VALUES ('tire', 'front_left_tire,' '2021-03-15 11:17: 32', {'air-pressure': 4.5, 'temperature': 90.81, 'rotations': 1020});

Similarly, the term "tenant" specifies the tenant's keyspace. The term "measurements" specifies a sensor data table specific to the tenant.

In this example, the sensor data specifies the structure ID is "tire" (referring to the metadata structure of the tire sensor group), the object ID is "front_left_tire" (indicating one particular tire having the tire sensor group), and the timestamp of the data measurement is "2021-03-15 11:17:32."

The sensor data also include three pairs of sensor parameters and sensor values: "air-pressure" is 4.5, "temperature" is 90.8, and "rotations" is 1020. The sensor parameters match the corresponding field names defined in the metadata structure with the structure ID "tire."

As described above, pairs of sensor parameters and sensor values can be packed or grouped into one or more data containers based on data types of the sensor values. As depicted in this example, each data container can be implemented as a data type-specific MAP in Apache Cassandra and denoted by a pair of curly brackets. Specifically, because the sensor values for both "air-pressure" and "temperature" have the "float" data type, these two sensor parameters and their corresponding sensor values (e.g., 4.5 and 90.8) are packed into one MAP (e.g., float_values 340A in FIG. 3). Similarly, because the sensor value for "rotations" has the "integer" data type, this sensor parameter and its corresponding sensor value (e.g., 1020) are packed into another MAP (e.g., int_values 340B in FIG. 3). In other examples, one or more data containers (e.g., MAPs) can be configured to contain sensor data of mixed data types.

In this example, the INSERT statement can write the above two data containers in two different columns of the sensor data table (e.g., "tenant.measurements"). For example, one column of the sensor data table can store two sensor parameters ("air-pressure" and "temperature") and the corresponding sensor values (4.5 and 90.8), and another column of the sensor data table can store the other sensor parameter ("rotations") and its corresponding sensor values (1020). Similar INSERT statements can be used to write data containers with mixed data types into columns of the sensor data table. As a result, one or more columns of the sensor data table can store sensor values of different data types.

As described herein, the order of the field names in the metadata structure and the order of the sensor parameters in the INSERT statement (for saving sensor data into the sensor data table) can be independent from each other. In fact, by packing the sensor data into different data containers, the order of the sensor parameters in the above INSERT statement can be different from the order of the field names in the metadata structure.

Example 7—Example Process of Storing Sensor Group Data

Figure 4:
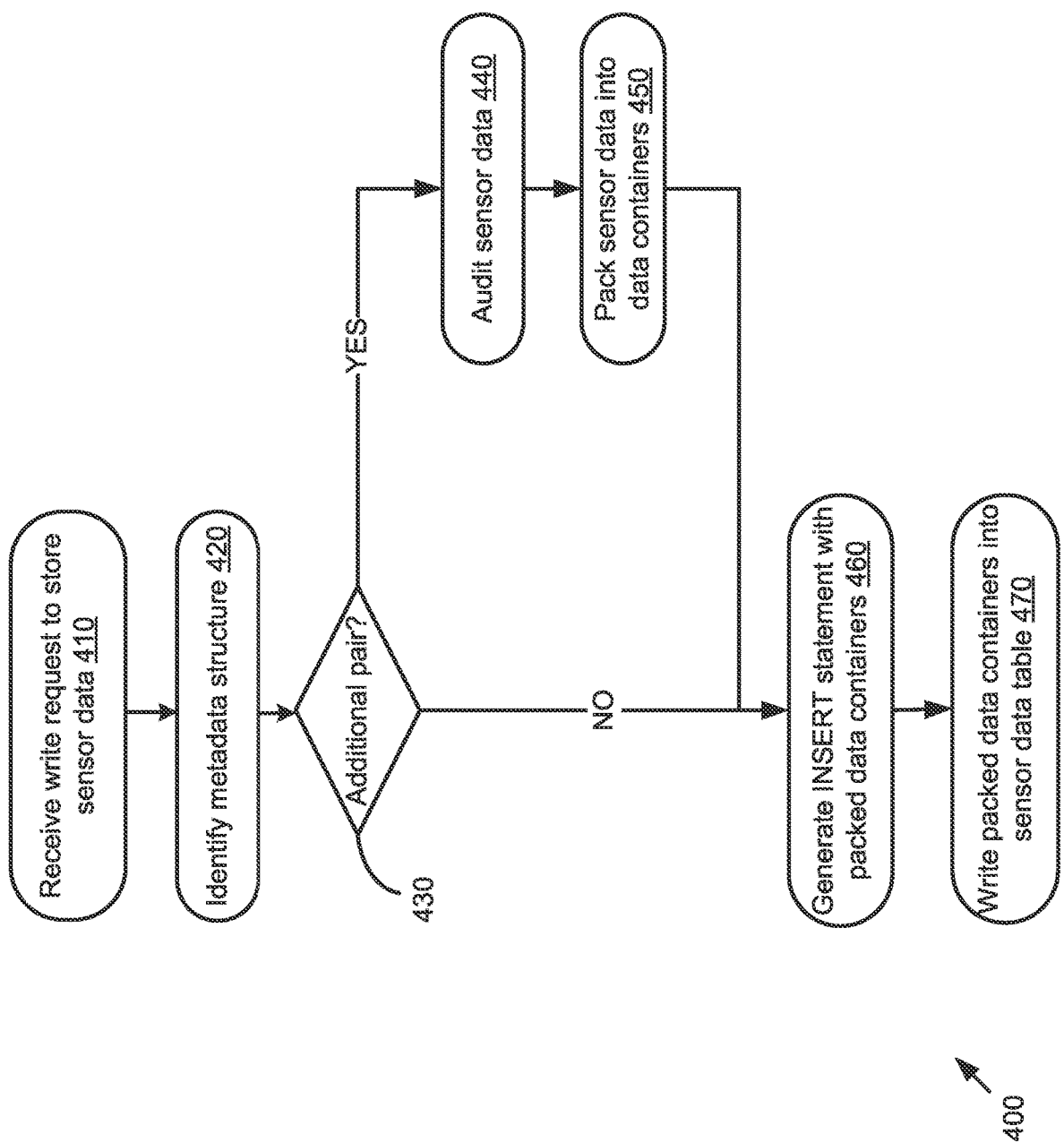
FIG. 4 is a flowchart depicting an example process of storing sensor group data.

FIG. 4 is flowchart depicting an example process or method 400 of storing sensor group data to a tenant-specific sensor data table (e.g., 182).

At 410, an object (e.g., 110) having a sensor group can send a request payload to a data storage and retrieval system (e.g., 140). Such request payload can be a write request to store selected sensor group data generated by the sensor group. The write request can be received by a controller (e.g., 162) of a timeseries backend (e.g., 160) residing in the data storage and retrieval system.

At 420, the controller can instruct a structure handler (e.g., 164) to search a structure table (e.g., 172) of the tenant (located in a metadata repository, e.g., 170) to identify a metadata structure corresponding to the sensor group. As described above, the sensor group data can include a structure ID identifying the sensor group. The metadata structure having a matching structure ID can be identified through the search.

The selected sensor group data can include a plurality of pairs of sensor parameters and sensor values. At 430, the method 400 can check if additional pairs need to be processed. The method 400 can loop through each pair of sensor parameter and sensor value for process steps 440 and 450 until all pairs are processed.

At 440, a selected pair of sensor parameter and sensor value are audited for validity. The sensor parameter is deemed valid if the senor parameter matches one of the field names defined in the metadata structure. On the other hand, if the sensor parameter does not match any of the field names (e.g., a new sensor is added to the sensor group but the metadata structure corresponding to the sensor group has not been updated in the structure table), then this pair of sensor parameter and sensor value are deemed invalid and will not be saved in the sensor data table.

Assume a valid sensor parameter is matched to a field name paired with a data type in a tuple, the sensor value is deemed valid if the data type of the sensor value matches the data type defined in the tuple. On the other hand, if the data type of the sensor value does not match the data type defined in the tuple (e.g., due to corruption of the sensor data or other reasons), then this pair of sensor parameter and sensor value are also deemed invalid and will not be saved in the sensor data table.

After passing the validity check, at 450, the pair of sensor parameter and sensor value can be packed to a corresponding data container. In one specific example, the packing can be based on data type of the sensor value. For example, if the sensor value is "float" data type, the pair of sensor parameter and sensor value can be packed in a MAP specific to float_values 340A, as described above. In other examples, a data container can be packed with mixed data types.

At 460, after all pairs of sensor parameters and sensor values are successfully audited and packed into respective data containers, an INSERT statement (similar to the one described above in Example 6) can be generated. As described above, such INSERT statement can specify the tenant-specific sensor data table, structure ID of the sensor group, object ID, timestamps, and one or more data containers that are packed with corresponding pairs of sensor parameters and sensor values.

At 470, the INSERT statement can be executed to store the sensor group data into the sensor data table.

In certain examples, the process steps 440, 450, 460, and/or 470 can be implemented by a timeseries storage handler (e.g., 166) of the timeseries backend.

Notably, the sensor data writing process depicted in FIG. 4 is targeted such that only requested sensor data is stored into the sensor data table. For example, the sensor group may generate sensor data from hundreds of sensors, but the request payload may only request storing sensor data from one or a few of the sensors. Instead of storing sensor data from all sensors, the process depicted in FIG. 4 allows targeted sensor data storage, e.g., by storing sensor data of only those sensors that are specified in the request payload.

Example 8—Example Process of Retrieving Sensor Group Data

Figure 5:
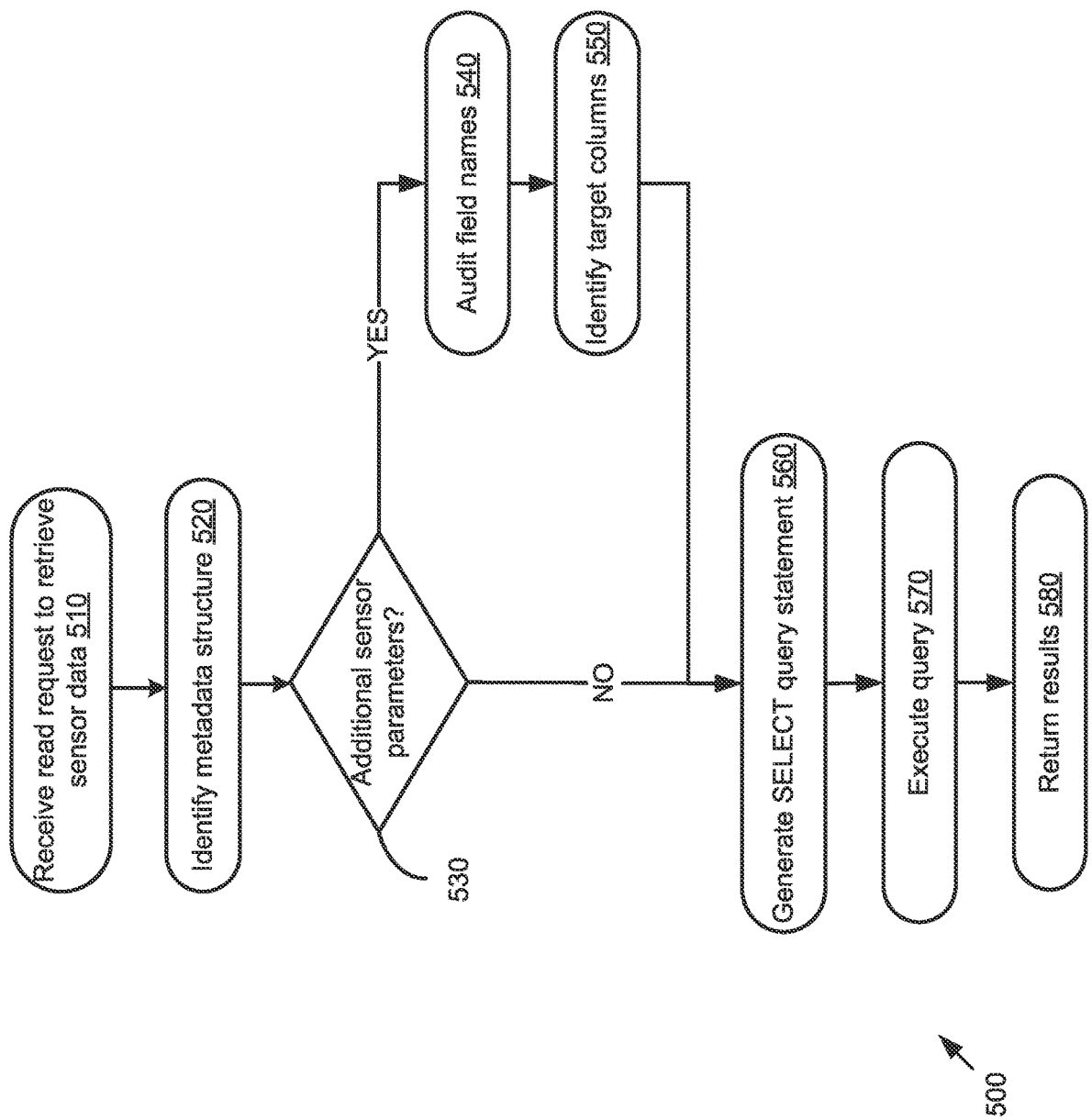
FIG. 5 is a flowchart depicting an example process of retrieving sensor group data.

FIG. 5 is a flowchart depicting an example process or method 500 of retrieving sensor group data from a tenant-specific sensor data table (e.g., 182).

At 510, a user (e.g., 130) can send a read request to a data storage and retrieval system (e.g., 140) to retrieve certain sensor data stored in the sensor data table. The read request can be received by a controller (e.g., 162) of a timeseries backend (e.g., 160) residing in the data storage and retrieval system. The read request can specify what sensor data needs to be returned. For example, the read request can specify a structure ID to identify a sensor group, at least one parameter in the sensor group, and one or more search criteria.

At 520, the controller can instruct a structure handler (e.g., 164) to search a structure table (e.g., 172) of the tenant (located in a metadata repository, e.g., 170) to identify a metadata structure having a matching structure ID specified in the read request.

If the read request specifies a plurality of sensor parameters, at 530, the method 500 can check if additional sensor parameters need to be processed. The method 500 can loop through each sensor parameter for process steps 540 and 550 until all sensor parameters are processed.

At 540, a selected sensor parameter can be audited for validity. The sensor parameter is deemed valid if the sensor parameter matches one field name defined in the tuples of the metadata structure. On the other hand, if the sensor parameter does not match any of the field names, then this sensor parameter is deemed invalid and no sensor value corresponding to this sensor parameter will be returned to the user.

After passing the validity check, at 550, a target column of the sensor data table can be identified. The target column stores data containers packed with the sensor parameter and sensor values paired with the one sensor parameter.

At 560, after all sensor parameters are successfully audited and corresponding target columns are identified, a query (e.g., a SELECT statement) can be generated based on the identified target columns of the sensor data table and the one or more search criteria specified in the read request. The following SELECT statement written in CQL represents an example query, which explicitly requests sensor values corresponding to a single sensor parameter:

SELECT "structure_id", "object_id", "time", "float_values" [temperature]
   FROM "tenant"."measurements"
   WHERE "structure_id"='tire'
     AND "object_id"='front_left_tire'
     AND "time"='2021-03-15 11:17:32';

In this example query, the read request is only directed to the "temperature" sensor parameter, which has float sensor values. Thus, the SELECT statement requests the data from the data container "float_values" via a key access by using a square bracket notation.

In certain examples, the SELECT statement can request sensor values of multiple sensor parameters corresponding to different sensors. The sensor parameters and sensor values may be packed in one or more data containers and stored in one or more columns of the sensor data table.

In certain examples, the query can be extended with a filter condition on both a sensor parameter and a sensor value packed in a data container (e.g., by activating a filter feature). For example, one such SELECT statement can be:

SELECT "structure_id", "object_id", "time", "float_values" [temperature]
   FROM "tenant"."measurements"
   WHERE "structure_id"='tire'
     AND "object_id"='front_left_tire'
     AND "time"='2021-03-15 11:17:32'
     AND "float_values" ['temperature']=90.8

In certain examples, text strings (which may contain status values of timeseries data and stored in a string-type data container) can be read jointly through the query.

At 570, the generated query can be executed against the sensor data table.

At 580, the query results can be returned to the user responsive to the read request. The query results include selected sensor values that are paired with the sensor parameters and meet the one or more search criteria specified in the read request.

Example 9—Example Use Cases

Example use cases are described below with references to FIGS. 6-8 to further illustrate the method of metadata-driven and containerized storage and retrieval of heterogenous sensor group data. Although the examples shown in FIGS. 6-8 use data containers that are type-specific, it should be understood that the same principles disclosed herein can be applied for storing and retrieving sensor group data using data containers that are configured to contain mixed data types.

Figure 6:
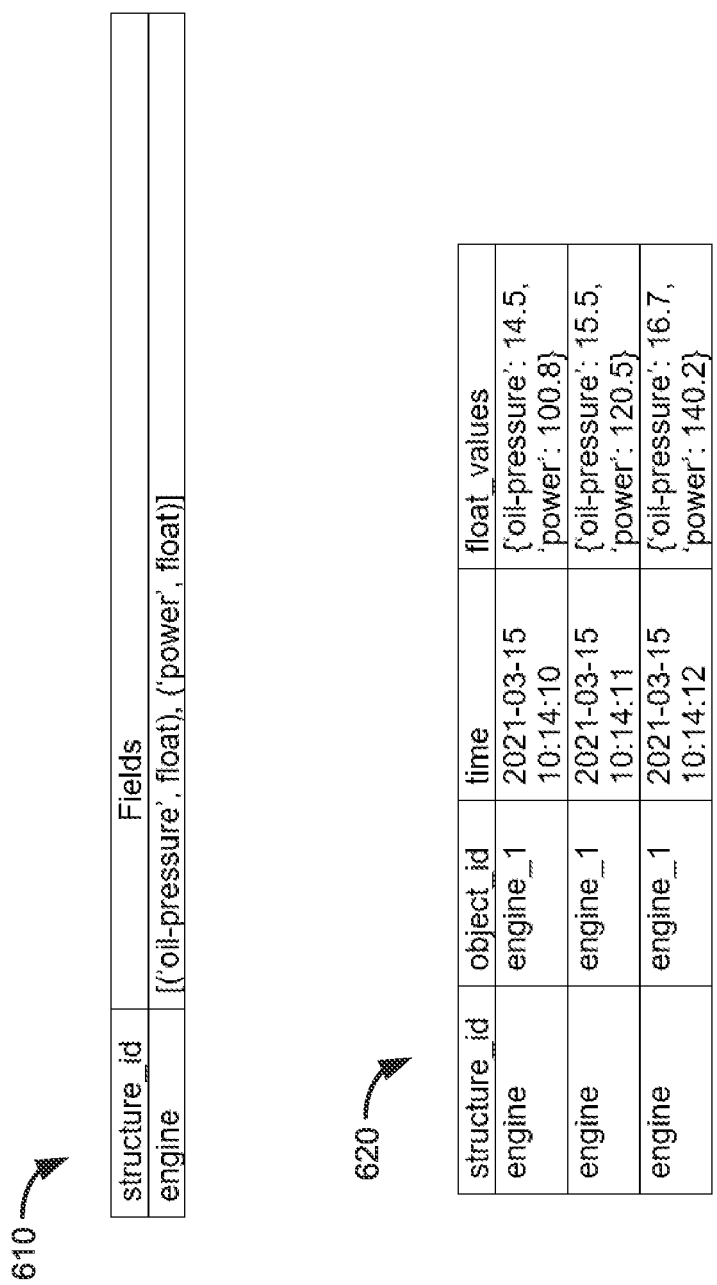
FIG. 6 depicts a structure table and a sensor data table, according to one example.

FIG. 6 shows an example structure table 610 comprising a metadata structure modelling an engine sensor group. The metadata structure has a structure_id "engine" and a list of fields including two (field name, data type) tuples configured to model two sensors: an "oil-pressure" sensor which has a "float" data type, and a "power" sensor which also has a "float" data type. As described above in Example 5, the metadata structure can be added to the structure table 610 via an INSERT statement.

FIG. 6 also shows an example sensor data structure table 620 comprising three records of sensor data measured by an object (with an object_id "engine_1"). The object's structure_id is "engine," which matches the structure_id of the metadata structure defined in the structure table 610.

Each record of sensor data includes two pairs of sensor parameters ("oil-pressure" and "power") and corresponding sensor values measured by two sensors within the sensor group. Because the sensor values of both sensors have "float" data type, both pairs of sensor parameters and sensor values are packed in a float-type data container "float_values," which can be stored in one single column of the sensor data table 620.

In addition, the timestamps ("time") of each record can be stored in one column of the sensor data table 620. In the depicted example, the timestamps are shown in text string format. In other examples, the timestamps can be stored in other data format (e.g., binary, etc.). As described above in Example 6, the three records of sensor data can be added to the sensor data table 620 via an INSERT statement.

FIG. 7 shows an updated structure table 710 and an updated sensor data table 720. Compared to 610, the structure table 710 adds a new metadata structure (e.g., via an INSERT statement) modelling a tire sensor group. The new metadata structure has a structure_id "tire" and a list of fields including three (field name, data type) tuples configured to model three sensors: a "rotations" sensor which has an "integer" data type, an "air-pressure" sensor which has a "float" data type, and a "temperature" sensor which also has a "float" data type.

After registering the metadata structure modelling the tire sensor group, sensor data measured from a tire object (e.g., "front_left_tire") can be added to the sensor data table 720 (e.g., via the INSERT statement). The tire object's structure_id ("tire") matches the structure_id of the new metadata structure.

In the depicted example, four new records of sensor data measured by three sensors in the "front_left_tire" are added to the sensor data table 720. Each new record of sensor data includes three pairs of sensor parameters ("rotations," "air-pressure," and "temperature") and corresponding sensor values.

Because the sensor values for both "air-pressure" and "temperature" sensors have "float" data type, these sensor values and their pairing sensor parameters are packed in the "float_values" data container and stored in the same column as the "float_values" data containers that pack the sensor data measured from the "engine_1."

Because the sensor values for the "rotations" sensor have an "integer" data type, the pairs of "rotations" and corresponding sensor values are packed into a different "integer_values" data container, which can be stored into another column of the sensor data table 720. In some examples, the column storing the "integer_values" can be created on-demand, e.g., after the "tire" metadata structure defining the tuple ('rotations', 'integer') is added to structure table 710. In other examples, the column storing the "integer_values" can be pre-created based on known or estimated data types that will be encountered.

FIG. 8 shows another updated structure table 810 and another updated sensor data table 820. Compared to 710, the structure table 810 has a modified metadata structure modelling the engine sensor group. This can occur, e.g., after a new sensor has been recently added to the engine sensor group. As a result, the metadata structure modelling the engine sensor group needs to be updated to reflect the change. As an example, the following UPDATE statement written in CQL illustrates how the metadata structure can be updated:

UPDATE tenant.structures
SET Fields=[('oil-pressure', float), ('power', float), ('engine-rotations', integer)] WHERE structure_id='engine'

The above UPDATE statement identifies the metadata structure whose structure_id is "engine" and replaces its list of fields by adding a new tuple, which is configured to model a newly added "engine-rotations" sensor with an "integer" data type.

Although the depicted example shows adding a new tuple to a metadata structure, it should be appreciated that the metadata structures in the structure table 810 can be updated in many different ways. For example, a metadata structure can be updated by removing an existing tuple (e.g., to model a scenario of removing a sensor from the corresponding sensor group). Additionally, and/or alternatively, a metadata structure can be updated by changing a field name and/or data type within a tuple (e.g., to model a scenario of replacing an old sensor with a new sensor in the sensor group).

After updating the metadata structure modeling the engine sensor group, new sensor data measured by three sensors in the "engine_1" object (conforming to the "engine" metadata structure) can be added to the sensor data table 820. In the depicted example, a new record of sensor data including three pairs of sensor parameters ("oil-pressure," "power," and "engine-rotations") and corresponding sensor values is added to the sensor data table 820, e.g., using the following INSERT statement:

INSERT INTO tenant.measurements (structure_id, object_id, time, float_values, int_values)
VALUES (engine, 'engine_1', '2021-03-15 13:10:00', {'oil-pressure': 14.8, 'power': 130.8}, {'engine-rotations': 3000});

Note that old records of sensor data measured from the engine sensor group (before adding the new "engine-rotations" sensor and updating the metadata structure for the engine sensor group) can still remain unchanged in the sensor data table 820.

As shown, the two pairs of sensor parameters ("oil-pressure" and "power") and corresponding sensor values are still packed in the "float_values" data container and stored in the same column as before. On the other hand, because the sensor values for the "engine-rotations" sensor have an "integer" data type, the pair of "engine-rotations" and corresponding sensor values are packed into the "integer_values" data container, which is stored into the same column as the "integer_values" data containers that pack the sensor data measured from the "front_left_tire."

Although the examples depicted in FIGS. 6-8 involve only two metadata structures modeling two sensor groups ("engine" and "tire") and two related objects ("engine_1" and "front_left_tire"), it is to be understood that the structure table (e.g., 610, 710, 810, etc.) can contain an arbitrary number of metadata structure having various configuration of sensors (with different data types). Additionally, the sensor data table (e.g., 620, 720, 820, etc.) can contain an arbitrary number of sensor data records organized in a plurality of columns, each column storing one data type-specific storage container.

Sensor data stored in the sensor data table can be retrieved by a user. As depicted in FIG. 5 and described above, a read request can be converted into a CQL SELECT statement. In the following example, the user is interested in the temperature of the "front_left_tire" measured over a timespan (e.g., 11:17:00 to 11:18:00), and the following SELECT statement can be generated by the system to fulfill such a read request:

SELECT "structure_id", "object_id", "time", "float_values" ['temperature']
FROM "tenant"."measurements"
WHERE "structure_id"='tire'
AND "object_id"=front_left_tire'
AND "time">='2021-03-15 11:17:00'
AND "time"<='2021-03-15 11:18:00';

Executing the above query can return records of sensor data that are specifically requested by the user (unrequested sensor data will not be returned). An example snippet of query results returned by the above query is listed below (and can be saved in a CSV format data file including a header row):

"structure_id"; "object_id"; "time"; "temperature"
"tire"; "front_left_tire"; "2021-03-15 11:17:30"; 90.8;

"tire"; "front_left_tire"; "2021-03-15 11:17:31"; 91.2;
"tire"; "front_left_tire"; "2021-03-15 11:17:32"; 92.1;
"tire"; "front_left_tire"; "2021-03-15 11:17:33"; 90.8.

Example 10—Example Advantages

A number of advantages can be achieved via the technology described herein. For example, the technology described herein provide a flexible solution for storing heterogenous sensor group data of a tenant in one single sensor data table specific to the tenant.

The sensor group data can include sensor data measured from an arbitrary number of sensor groups, and each sensor group can include an arbitrary number of sensors having heterogenous data types. Despite such sensor group data heterogeneity, by providing a structure table containing metadata structures modeling the sensor groups, each tenant only needs a single sensor data table to store all sensor group data. For example, in certain scenarios, different columns of the sensor data table can store data type-specific data containers. Because there are limited number of data types, the number of columns in the sensor data table is also limited. Allocating one sensor data table (and one structure table) per tenant can be particularly advantageous for a multitenant database, where many tenants may need vastly different sensor data storage demand and each tenant may have a unique configuration of sensor groups. Despite these differences, different tenants can share the same architecture of data storage and retrieval system.

Further, a tenant's sensor groups may change over time, e.g., by introducing new sensor groups, removing existing sensor groups, and/or modifying existing sensor groups. As described above, the technology described herein allows dynamically updating the structure table, thus allowing the sensor data table to adapt to structural changes of the sensor groups.

Moreover, as described above, retrieval of sensor data from the sensor data table can be targeted such that only requested sensor data is returned. Such feature represents an improvement in both operating efficiency (e.g., data transmission) and memory usage compared to the conventional BLOB approach which can incur additional overhead or waste by returning unneeded/unrequested sensor data.

Example 11—Example Computing Systems

Figure 9:
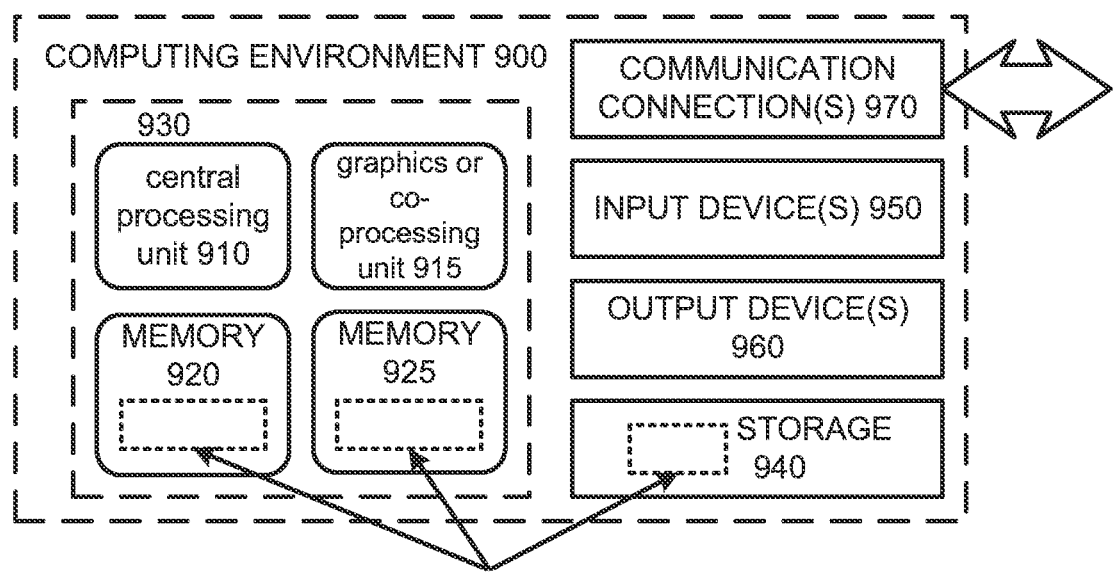
FIG. 9 is a block diagram of an example computing system in which described embodiments can be implemented.

FIG. 9 depicts an example of a suitable computing system 900 in which the described innovations can be implemented. The computing system 900 is not intended to suggest any limitation as to scope of use or functionality of the present disclosure, as the innovations can be implemented in diverse computing systems.

With reference to FIG. 9, the computing system 900 includes one or more processing units 910, 915 and memory 920, 925. In FIG. 9, this basic configuration 930 is included within a dashed line. The processing units 910, 915 can execute computer-executable instructions, such as for implementing the features described in the examples herein (e.g., the methods 200, 400, 500). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 9 shows a central processing unit 910 as well as a graphics processing unit or co-processing unit 915. The tangible memory 920, 925 can be volatile memory (e.g., registers, cache, RAM), non-volatile memory (e.g., ROM, EEPROM, flash memory, etc.), or some combination of the two, accessible by the processing unit(s) 910, 915. The memory 920, 925 can store software 980 implementing one or more innovations described herein, in the form of computer-executable instructions suitable for execution by the processing unit(s) 910, 915.

A computing system 900 can have additional features. For example, the computing system 900 can include storage 940, one or more input devices 950, one or more output devices 960, and one or more communication connections 970, including input devices, output devices, and communication connections for interacting with a user. An interconnection mechanism (not shown) such as a bus, controller, or network can interconnect the components of the computing system 900. Typically, operating system software (not shown) can provide an operating environment for other software executing in the computing system 900, and coordinate activities of the components of the computing system 900.

The tangible storage 940 can be removable or non-removable, and includes magnetic disks, magnetic tapes or cassettes, CD-ROMs, DVDs, or any other medium which can be used to store information in a non-transitory way and which can be accessed within the computing system 900. The storage 940 can store instructions for the software 280 implementing one or more innovations described herein.

The input device(s) 950 can be an input device such as a keyboard, mouse, pen, or trackball, a voice input device, a scanning device, touch device (e.g., touchpad, display, or the like) or another device that provides input to the computing system 900. The output device(s) 960 can be a display, printer, speaker, CD-writer, or another device that provides output from the computing system 900.

The communication connection(s) 970 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 12—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 13—Example Cloud Computing Environment

Figure 10:
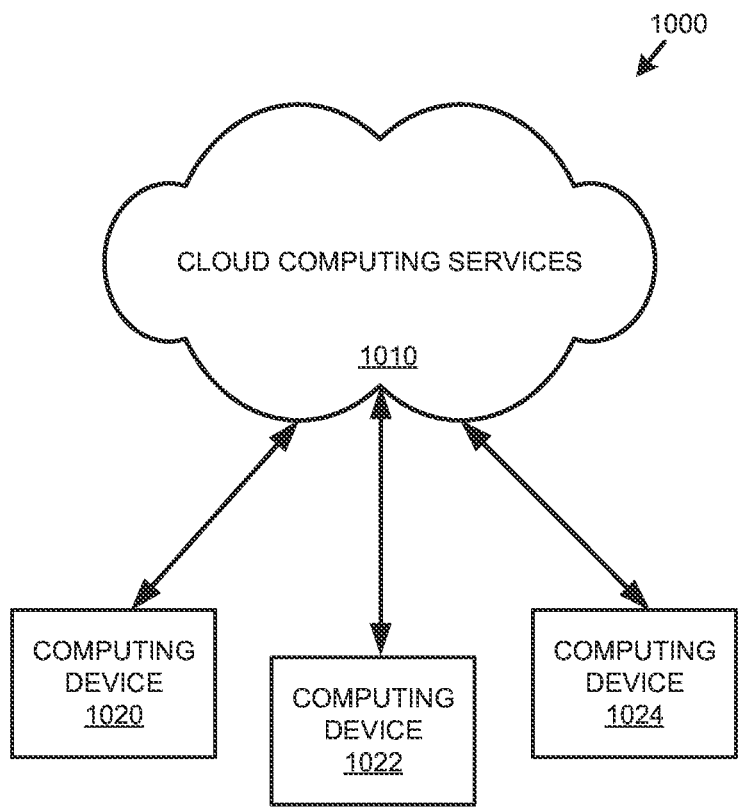
FIG. 10 is a block diagram of an example cloud computing environment that can be used in conjunction with the technologies described herein.

FIG. 10 depicts an example cloud computing environment 1000 in which the described technologies can be implemented, including, e.g., the system 100 and other systems herein. The cloud computing environment 1000 can include cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 can be utilized by various types of computing devices (e.g., client computing devices), such as computing devices 1020, 1022, and 1023. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

In practice, cloud-based, on-premises-based, or hybrid scenarios can be supported.

Example 14—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 15—Example Embodiments

Any of the following example embodiments can be implemented.

Example 1. A computer-implemented method comprising: receiving a write request to store sensor data generated by a sensor group comprising a plurality of sensors, the sensor data comprising at least a structure identifier and one or more pairs of sensor parameters and sensor values; identifying a metadata structure based on the structure identifier, wherein the metadata structure comprises a plurality of tuples corresponding to the plurality of sensors in the sensor group, wherein the tuples define pairs of field names and data types of the corresponding sensors; packing the one or more pairs of sensor parameters and sensor values into one or more data containers; and storing the one or more data containers respectively into one or more columns of a sensor data table.

Example 2. The method of example 1, wherein the packing is based on data types of the sensor data, wherein sensor values in different data types are stored in different columns of the sensor data table.

Example 3. The method of any one of examples 1-2, further comprising auditing the sensor data based on the metadata structure, wherein the auditing comprises: comparing the sensor parameters with the field names defined in the tuples of the metadata structure; and comparing data types of the sensor values with the data types defined in the tuples of the metadata structure.

Example 4. The method of any one of examples 1-3, further comprising registering the metadata structure in a structure table, wherein the registering comprises saving the structure identifier and the plurality of tuples into a record of the structure table.

Example 5. The method of example 4, further comprising updating the metadata structure in the structure table when a new sensor is added to the sensor group, wherein the updating comprises adding a new tuple defining a pair of field name and data type of the new sensor in the metadata structure.

Example 6. The method of example 5, further comprising adding a new column to the sensor data table if the data type of the new sensor is different from the data types of the plurality of sensors before updating the metadata structure.

Example 7. The method of any one of examples 1-6, further comprising: receiving a read request specifying at least one sensor parameter in the sensor group and one or more search criteria; and executing a query against the sensor data table to return selected sensor values that are paired with the at least one sensor parameter and meet the one or more search criteria.

Example 8. The method of example 7, further comprising determining the at least one sensor parameter matches one field name defined in the tuples of the metadata structure.

Example 9. The method of any one of examples 7-8, further comprising identifying a target column of the sensor data table containing data containers packed with the at least one sensor parameter and sensor values paired with the at least one sensor parameter.

Example 10. The method of example 9, further comprising generating the query based on at least the identified target column of the sensor data table and the one or more search criteria.

Example 11. A computing system, comprising: memory; one or more hardware processors coupled to the memory; and one or more computer readable storage media storing instructions that, when loaded into the memory, cause the one or more hardware processors to perform operations comprising: receiving a write request to store sensor data generated by a sensor group comprising a plurality of sensors, the sensor data comprising at least a structure identifier and one or more pairs of sensor parameters and sensor values; identifying a metadata structure based on the structure identifier, wherein the metadata structure comprises a plurality of tuples corresponding to the plurality of sensors in the sensor group, wherein the tuples define pairs of field names and data types of the corresponding sensors; packing the one or more pairs of sensor parameters and sensor values into one or more data containers; and storing the one or more data containers respectively into one or more columns of a sensor data table.

Example 12. The method of example 11, wherein the packing is based on data types of the sensor data, wherein sensor values in different data types are stored in different columns of the sensor data table.

Example 13. The system of example 12, wherein the operations further comprise auditing the sensor data based on the metadata structure, wherein the auditing comprises: comparing the sensor parameters with the field names defined in the tuples of the metadata structure; and comparing data types of the sensor values with the data types defined in the tuples of the metadata structure.

Example 14. The system of any one of examples 11-13, wherein the operations further comprise registering the metadata structure in a structure table, wherein the registering comprises saving the structure identifier and the plurality of tuples into a record of the structure table.

Example 15. The system of example 14, wherein the operations further comprise updating the metadata structure in the structure table when a new sensor is added to the sensor group, wherein the updating comprises adding a new tuple defining a pair of field name and data type of the new sensor in the metadata structure.

Example 16. The system of example 15, wherein the operations further comprise adding a new column to the sensor data table if the data type of the new sensor is different from the data types of the plurality of sensors before updating the metadata structure.

Example 17. The system of any one of examples 11-16, wherein the operations further comprise: receiving a read request specifying at least one sensor parameter in the sensor group and one or more search criteria; and executing a query against the sensor data table to return selected sensor values that are paired with the at least one sensor parameter and meet the one or more search criteria.

Example 18. The system of example 17, wherein the operations further comprise identifying a target column of the sensor data table containing data containers packed with the at least one sensor parameter and sensor values paired with the at least one sensor parameter.

Example 19. The system of example 18, wherein the operations further comprise generating the query based on at least the identified target column of the sensor data table and the one or more search criteria.

Example 20. One or more non-transitory computer-readable media having encoded thereon computer-executable instructions causing one or more processors to perform a method comprising: receiving a write request to store sensor data generated by a sensor group comprising a plurality of sensors, the sensor data comprising at least a structure identifier and one or more pairs of sensor parameters and sensor values; identifying a metadata structure based on the structure identifier, wherein the metadata structure comprises a plurality of tuples corresponding to the plurality of sensors in the sensor group, wherein the tuples define pairs of field names and data types of the corresponding sensors; packing the one or more pairs of sensor parameters and sensor values into one or more data containers based on data types of the sensor data; storing the one or more data containers respectively into one or more columns of a sensor data table, wherein sensor values in different data types are stored in different columns of the sensor data table; receiving a read request specifying at least one sensor parameter in the sensor group and one or more search criteria; identifying a target column of the sensor data table containing data containers packed with the at least one sensor parameter and sensor values paired with the at least one sensor parameter; generating a query based on at least the identified target column of the sensor data table and the one or more search criteria; and executing the query against the sensor data table to return selected sensor values that are paired with the at least one sensor parameter and meet the one or more search criteria.

Example 16—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method for storing heterogenous sensor group data of tenants in a multitenant database, the computer-implemented method comprising:
   receiving a write request to store sensor data generated by a sensor group comprising a plurality of sensors of a tenant, the sensor data comprising at least a structure identifier identifying the sensor group and one or more pairs of sensor parameters and sensor values generated by the plurality of sensors;
   identifying a metadata structure stored in a structure table that is specific to the tenant, wherein the metadata structure comprises the structure identifier and a list of fields organized in a plurality of tuples, wherein each tuple is a two-element pair specifying a field name and a data type for a corresponding sensor in the sensor group;
   packing the one or more pairs of sensor parameters and sensor values into one or more data containers as a set of key-value pairs, wherein the packing is based on data types of the sensor data, wherein the sensor values in different data types are packed into different data containers; and
   storing the one or more data containers respectively into one or more columns of a sensor data table that is specific to the tenant and separate from the structure table, wherein the key-value pairs packed in a selected data container are stored in a corresponding column of the sensor data table,
   wherein at least one column of the sensor data table includes pairs of sensor parameters and sensor values generated by two different sensors in the sensor group.

2. The computer-implemented method of claim 1, further comprising auditing the sensor data based on the metadata structure, wherein the auditing comprises:
   comparing the sensor parameters with the field names defined in the tuples of the metadata structure; and comparing the data types of the sensor values with the data types defined in the tuples of the metadata structure.

3. The computer-implemented method of claim 1, further comprising registering the metadata structure in the structure table, wherein the registering comprises saving the structure identifier and the list of fields into the structure table.

4. The computer-implemented method of claim 3, further comprising updating the metadata structure in the structure table when a new sensor is added to the sensor group, wherein the updating comprises adding a new tuple to the list of fields, wherein the new tuple defines a pair of field name and data type of the new sensor in the metadata structure.

5. The computer-implemented method of claim 4, further comprising adding a new column to the sensor data table if the data type of the new sensor is different from the data types of the plurality of sensors before updating the metadata structure.

6. The computer-implemented method of claim 1, further comprising:
receiving a read request specifying at least one sensor parameter in the sensor group and one or more search criteria; and
executing a query against the sensor data table to return selected sensor values that are paired with the at least one sensor parameter and meet the one or more search criteria.

7. The computer-implemented method of claim 6, further comprising determining the at least one sensor parameter matches one field name defined in the tuples of the metadata structure.

8. The computer-implemented method of claim 6, further comprising identifying a target column of the sensor data table containing data containers packed with the at least one sensor parameter and sensor values paired with the at least one sensor parameter.

9. The computer-implemented method of claim 8, further comprising generating the query based on at least the identified target column of the sensor data table and the one or more search criteria.

10. A computing system for storing heterogenous sensor group data of tenants in a multitenant database, the computing system comprising:
memory;
one or more hardware processors coupled to the memory; and
one or more non-transitory computer-readable media storing instructions that, when loaded into the memory, cause the one or more hardware processors to perform operations comprising:
receiving a write request to store sensor data generated by a sensor group comprising a plurality of sensors of a tenant, the sensor data comprising at least a structure identifier identifying the sensor group and one or more pairs of sensor parameters and sensor values generated by the plurality of sensors;
identifying a metadata structure stored in a structure table that is specific to the tenant, wherein the metadata structure comprises the structure identifier and a list of fields organized in a plurality of tuples, wherein each tuple is a two-element pair specifying a field name and a data type for a corresponding sensor in the sensor group;
packing the one or more pairs of sensor parameters and sensor values into one or more data containers as a set of key-value pairs, wherein the packing is based on data types of the sensor data, wherein the sensor values in different data types are packed into different data containers; and
storing the one or more data containers respectively into one or more columns of a sensor data table that is specific to the tenant and separate from the structure table, wherein the key-value pairs packed in a selected data container are stored in a corresponding column of the sensor data table,
wherein at least one column of the sensor data table includes pairs of sensor parameters and sensor values generated by two different sensors in the sensor group.

11. The computing system of claim 10, wherein the operations further comprise auditing the sensor data based on the metadata structure, wherein the auditing comprises:
comparing the sensor parameters with the field names defined in the tuples of the metadata structure; and
comparing the data types of the sensor values with the data types defined in the tuples of the metadata structure.

12. The computing system of claim 10, wherein the operations further comprise registering the metadata structure in the structure table, wherein the registering comprises saving the structure identifier and the list of fields into the structure table.

13. The computing system of claim 12, wherein the operations further comprise updating the metadata structure in the structure table when a new sensor is added to the sensor group, wherein the updating comprises adding a new tuple to the list of fields, wherein the new tuple defines a pair of field name and data type of the new sensor in the metadata structure.

14. The computing system of claim 13, wherein the operations further comprise adding a new column to the sensor data table if the data type of the new sensor is different from the data types of the plurality of sensors before updating the metadata structure.

15. The computing system of claim 10, wherein the operations further comprise:
receiving a read request specifying at least one sensor parameter in the sensor group and one or more search criteria; and
executing a query against the sensor data table to return selected sensor values that are paired with the at least one sensor parameter and meet the one or more search criteria.

16. The computing system of claim 15, wherein the operations further comprise identifying a target column of the sensor data table containing data containers packed with the at least one sensor parameter and sensor values paired with the at least one sensor parameter.

17. The computing system of claim 16, wherein the operations further comprise generating the query based on at least the identified target column of the sensor data table and the one or more search criteria.

18. One or more non-transitory computer-readable media having encoded thereon computer-executable instructions causing one or more processors to perform a method for storing heterogenous sensor group data of tenants in a multitenant database, the method comprising:
receiving a write request to store sensor data generated by a sensor group comprising a plurality of sensors of a tenant, the sensor data comprising at least a structure identifier identifying the sensor group and one or more pairs of sensor parameters and sensor values generated by the plurality of sensors;

identifying a metadata structure stored in a structure table that is specific to the tenant, wherein the metadata structure comprises the structure identifier and a list of fields organized in a plurality of tuples, wherein each tuple is a two-element pair specifying a field name and a data type for a corresponding sensor in the sensor group;

packing the one or more pairs of sensor parameters and sensor values into one or more data containers as a set of key-value pairs based on data types of the sensor data, wherein the packing is based on data types of the sensor data, wherein the sensor values in different data types are packed into different data containers;

storing the one or more data containers respectively into one or more columns of a sensor data table that is specific to the tenant and separate from the structure table, wherein the key-value pairs packed in a selected data container are stored in a corresponding column of the sensor data table, wherein sensor values in different data types are stored in different columns of the sensor data table, wherein at least one column of the sensor data table includes pairs of sensor parameters and sensor values generated by two different sensors in the sensor group;

receiving a read request specifying at least one sensor parameter in the sensor group and one or more search criteria;

identifying a target column of the sensor data table containing data containers packed with the at least one sensor parameter and sensor values paired with the at least one sensor parameter;

generating a query based on at least the identified target column of the sensor data table and the one or more search criteria; and executing the query against the sensor data table to return selected sensor values that are paired with the at least one sensor parameter and meet the one or more search criteria.

* * * * *